(12) United States Patent
Ask et al.

(10) Patent No.: US 6,754,580 B1
(45) Date of Patent: Jun. 22, 2004

(54) SYSTEM FOR GUIDING VEHICLES

(75) Inventors: Benny Ask, Rotbacken 26, SE-163 54 Spånga (SE); Lennart Ask, Östergårdsgatan 36, SE-442 52 Ytterby (SE)

(73) Assignees: Benny Ask (SE); Lennart Ask (SE)

( * ) Notice: Subject to any disclaimer, the term of this patent is extended or adjusted under 35 U.S.C. 154(b) by 79 days.

(21) Appl. No.: 10/088,065

(22) PCT Filed: Sep. 21, 2000

(86) PCT No.: PCT/SE00/01836
§ 371 (c)(1),
(2), (4) Date: Mar. 12, 2002

(87) PCT Pub. No.: WO01/22035
PCT Pub. Date: Mar. 29, 2001

(30) Foreign Application Priority Data

Sep. 21, 1999 (SE) .............................................. 9903409

(51) Int. Cl.⁷ .............................................. G06F 19/00
(52) U.S. Cl. .............. 701/117; 340/995.23; 340/995.24
(58) Field of Search ................................. 701/117, 207, 701/209; 455/456; 340/990, 995.23, 995.24

(56) References Cited

U.S. PATENT DOCUMENTS

| | | | |
|---|---|---|---|
| 4,888,699 A | 12/1989 | Knoll et al. ................ | 701/209 |
| 5,543,789 A | 8/1996 | Behr et al. ............. | 340/995.12 |
| 5,610,821 A | 3/1997 | Gazis et al. ................ | 455/456 |
| 5,721,678 A | 2/1998 | Widl .......................... | 705/417 |
| 5,933,100 A | 8/1999 | Golding ...................... | 340/995 |

FOREIGN PATENT DOCUMENTS

| | | |
|---|---|---|
| EP | 0345818 | 12/1989 |
| EP | 0572129 | 7/1993 |
| WO | 9909374 | 2/1999 |

*Primary Examiner*—Marthe Y. Marc-Coleman
(74) *Attorney, Agent, or Firm*—Orum & Roth (57) ABSTRACT

A system for controlling vehicle movements on a road network. The system provides for identification data and road information transmission between a vehicle and a traffic information center. The road network is so arranged as to be entered into the system in such a way that it is regarded as a data network, and each vehicle that is intended to make use of the road network is logged in for travelling on the road network, and each vehicle identifies itself at the time of logging in, the identity is either dynamic or static. Information relating to the intended destination is transmitted for each vehicle to the traffic information center, and information about the position and the speed of the vehicle is also reported at regular intervals to the aforementioned traffic information center, so that overall control of the traffic is achieved.

13 Claims, 8 Drawing Sheets

SYSTEM FOR GUIDING VEHICLES

BACKGROUND OF THE INVENTION

1. Field of the Invention

The present invention relates to a system for controlling vehicle movements, principally in densely populated areas containing a road network, in conjunction with which each vehicle exhibits means for identification, means for road information and means for the transmission of information between the vehicle in questions and a traffic information center.

2. Description of Related Art

Attempts at achieving control of traffic flows in towns and cities and in similar locations where the traffic volume is high have already been disclosed. The individual does not have a choice or route via which to drive the vehicle to its intended destination. Shown in U.S. Pat. No. 5,543,789 A, for example, is a system and method for obtaining route control from a traffic control center or similar.

U.S. Pat. No. 5,721,678 also shows a payment system for vehicles. EP 0 572 129 A1 shows a unit for indicating a choice of route. Finally, U.S. Pat. No. 4,888,699 A shows a system for vehicle navigation.

The aforementioned previously disclosed systems resort to a static traffice model based on historical information, and to which an attempt is made to add dynamic information gathered from various points of measurement.

Reliable traffic measurement equipment is expensive, and this is the reason why few measurement points have been used. This further reduces the accuracy of the calculated information.

Various vehicle systems are also previously disclosed through the patent publications referred to below, which exhibit the indicated characteristics.

U.S. Pat. No. 5,610,821 A—IBM
- Calculates the optimal route for the vehicles based solely on the current traffic flow.
- Consists of several interlinked information centers, ICs.
- IC stores a model of the road network.
- Communication to the vehicle's computer equipment.
- Each vehicle has an IP address.
- Optimization according to the cheapest route or the latest acceleration.
- IBM ThinkPAD in the vehicle.
- Floating-car-data
- Dynamic guiding only if a major change occurs in the road network.

WO 99/09374 A2—Siemens
- Guiding
- Floating-car-data, sporadically checks the information received by the controlled vehicle.
- Version handling of maps and software.

EP 0345818—OKI Electric Industry Company
- ID based on a vehicle-specific code, system code, earth station code, mobile station code, destination code and driving area code.
- "Frame": Introductory field, vehicle ID field, multiple distributor field, vehicle communication field, end communication field.

U.S. Pat. No. 5,721,678—Mannesmann
- Payment card the vehicle for recording road use charges.

The prior art discloses systems that are essentially fixed in conjunction with the guiding of vehicles in a road network based on a number of links with indicated speed information. The traffic is controlled "optimally" via traffic information centers.

There is no indication of additional information in respect of identification of the vehicle: vehicle type, size and environmental data, etc. This means that heavy goods vehicles are guided in the same way as passenger cars, and that tall vehicles can be directed to drive under bridges with insufficient headroom, heavy vehicles can be directed onto bridges over which they are not permitted to drive, and that no account is taken of the environment in conjunction with guiding, etc.

The prior art does not focus on the fact that the vehicles must be "logged into" the system, making them known and at all times identified with an indication of their position. This is a precondition for the more detailed control of signals, among other things, but is also good for obtaining "floating-car-data" of high quality and, among other things, for the ability to debit road use and/or environmental charges.

The prior art also does not contain any reference to the fact that the road network must have, for example, environmental and vehicle type classification in order for guiding to function correctly. Nor does it disclose guiding that takes place in order to optimize the entire traffic operation in the system. There is also no mention of the control of signals and other peripheral equipment which has an influence on the flow in the systems as a whole.

SUMMARY OF THE INVENTION

The principal object of the present invention is thus, in the first instance, to solve the aforementioned problems by adopting as the starting point the available information about vehicle movements in the traffic system, and to perform the calculations required in order to optimize the flow deriving therefrom. No investments in a fixed infrastructure are required in conjunction with this.

The aforementioned object is achieved by means of a system in accordance with the present invention, which is characterized essentially in that the road network is so arranged as to be entered into the system in such a way that is regarded as a data network, in that each vehicle that is intended to make use of the road network is logged in for travelling on the road network, in that each vehicle identifies itself at the time of logging in, in conjunction with which the aforementioned identity is either dynamic or static, in that information relating to the intended destination is sent in from each vehicle to the traffic information center, in that information about the position and the speed of the vehicle is reported at regular intervals to the aforementioned traffic information center, whereby overall control of the traffic is achieved on the basis of the information reported to the traffic information center, in that information about the proposed route for each vehicle selected in this way is transmitted from the traffic information center to the vehicle in question and in that way achieves dynamic guiding of the traffic, and in that, thanks to the fact that all the vehicle's movements are known, an overall traffic system is achieved which exhibits an exact image of the actual traffic situation, whereby the possibility is provided for control of the same centrally.

In order to obtain guiding, the amount of information required is greater than that indicated by earlier inventions. Provided disclosed (e.g. via Patent EP 0345818 A2) is the identification of communication with a vehicle via an ID. In this case, the guiding design can only be based on the information collected in respect of the traffic flow. This invention includes a Guiding ID which contains a number of components as support for a guiding decision, based on a number of components, at the information center;

controlling traffic signals and other road equipment;

obtaining different services which are intended primarily to reduce the transport work.

This ID is also used for communication between items of vehicle equipment and between vehicles and roadside equipment.

ID, logging in and road network are significant, which is unique to the system.

I. Identification is important and includes, inter alia

IP address or a similar network identity

Use stored information about the user of the service

Vehicle information, vehicle type (bus, car)

Environmental equipment, size (height/length), etc.

Goods/passenger information (number of passengers, hazardous goods, etc.)

Vehicle's/driver's/passenger's communication equipment, type (mobile telephone, palmtop, in-car computer/BMW, etc.), network/operator for communication, language and level of information, versions sw/hw, map handling functionality, versions of map modules for traffic area Other information (parking space required, etc.)

Requests for priority/green wave/"warning signals on", etc., can be sent to the roadside equipment for local autonomous systems. The area of application includes public transport, emergency vehicles, heavy goods vehicles and environmentally hazardous transport, etc.

II. Logging in is important

Logging in can be effected prior to the start of the journey, for example, via a mobile telephone. This means that traffic information can be provided, which may cause the traveler to choose a different time of travel/route/destination.

Logging in permits everyone in the system to obtain information and means that all vehicle movements are known.

Different interactive systems along the route are activated, such as signals, etc.

The vehicle reports its position, etc., continuously in order for the systems to be capable of observing the dynamic.

III. Regarding the road network as computer network is important

The road network consists of a series of links with different speeds, permitted types of vehicle and environmental requirements, etc. The network also contains dynamic information about road works and temporary road closures, etc.

Guiding takes place with a view to optical utilization of the road network. In that connection, use is made of different forms of peripheral equipment and services in order to minimize the driving time. This applies to the control of signals, bridge opening and public transport, etc., and to the reservation of parking spaces and the automatic payment of road use charges, etc.

Optimal guiding is achieved only when complete identification has been obtained and this has been applied via logging in (together with continuous reporting of the position, etc.) in order to control peripheral equipment and make use of various peripheral services to optimize the flow in the "data network", and the calculation of the optimal route is based on this extra information.

Supplementary information can also be distributed in respect of temporarily reduced speeds in conjunction with road works or, for example, near schools and dynamic humps if the vehicle equipment permits this.

BRIEF DESCRIPTION OF THE DRAWINGS

The invention is described below as a preferred illustrative embodiment, in conjunction with which reference is made to the accompanying drawings, in which FIGS. 1–6 show the block diagram of different parts of the system, where:

FIG. 2 shows validation of the logging in;

DETAILED DESCRIPTION OF THE INVENTION

Figure 1:
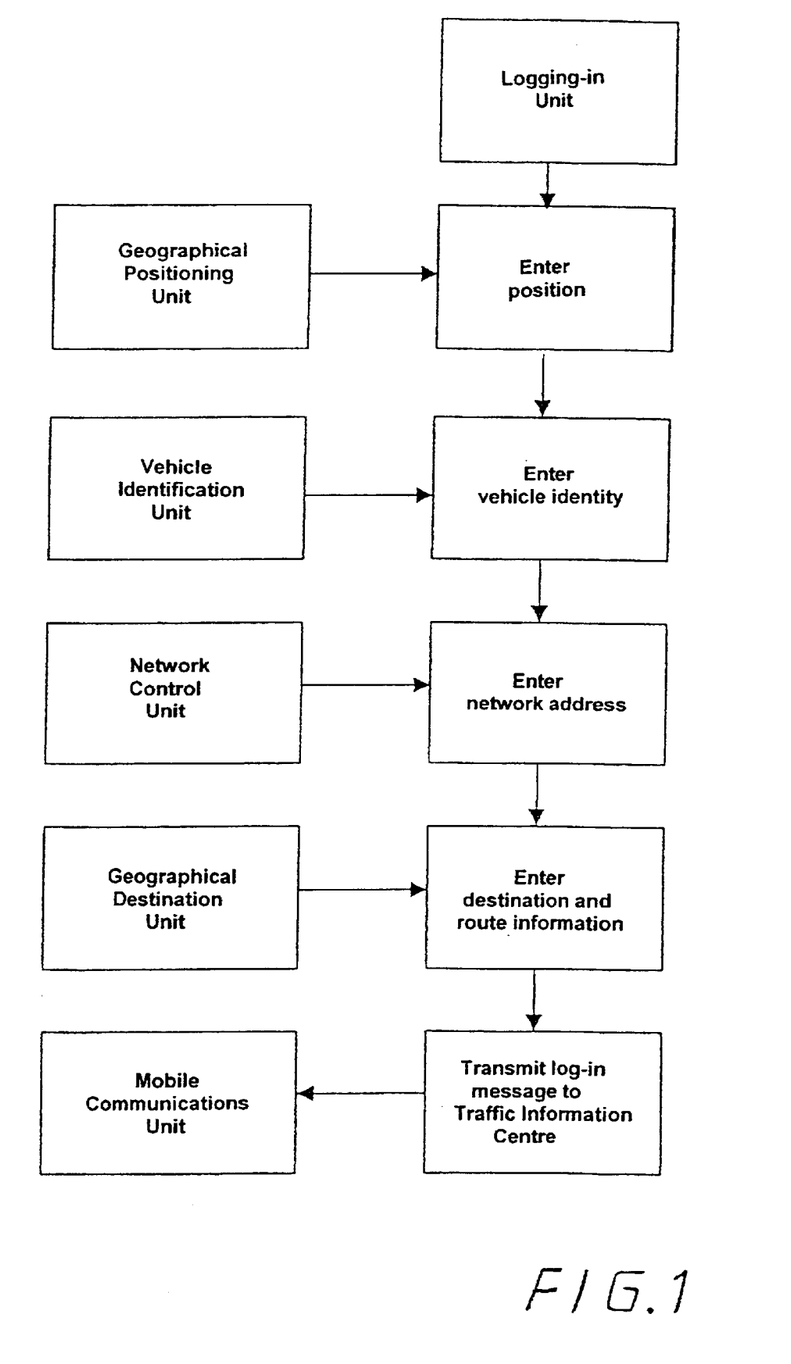
FIG. 1 shows logging in of the vehicle.
Figure 2:
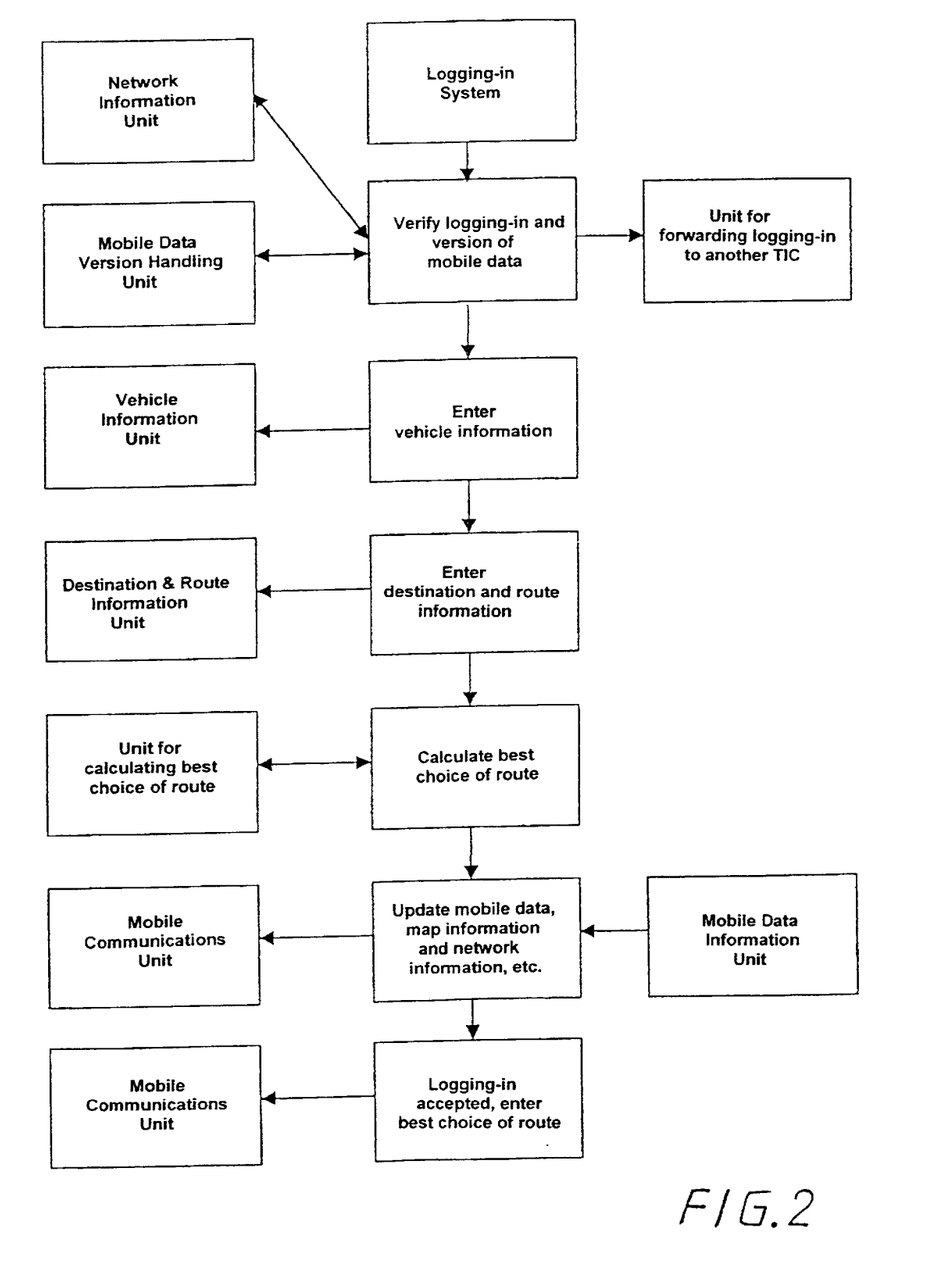
Figure 3:
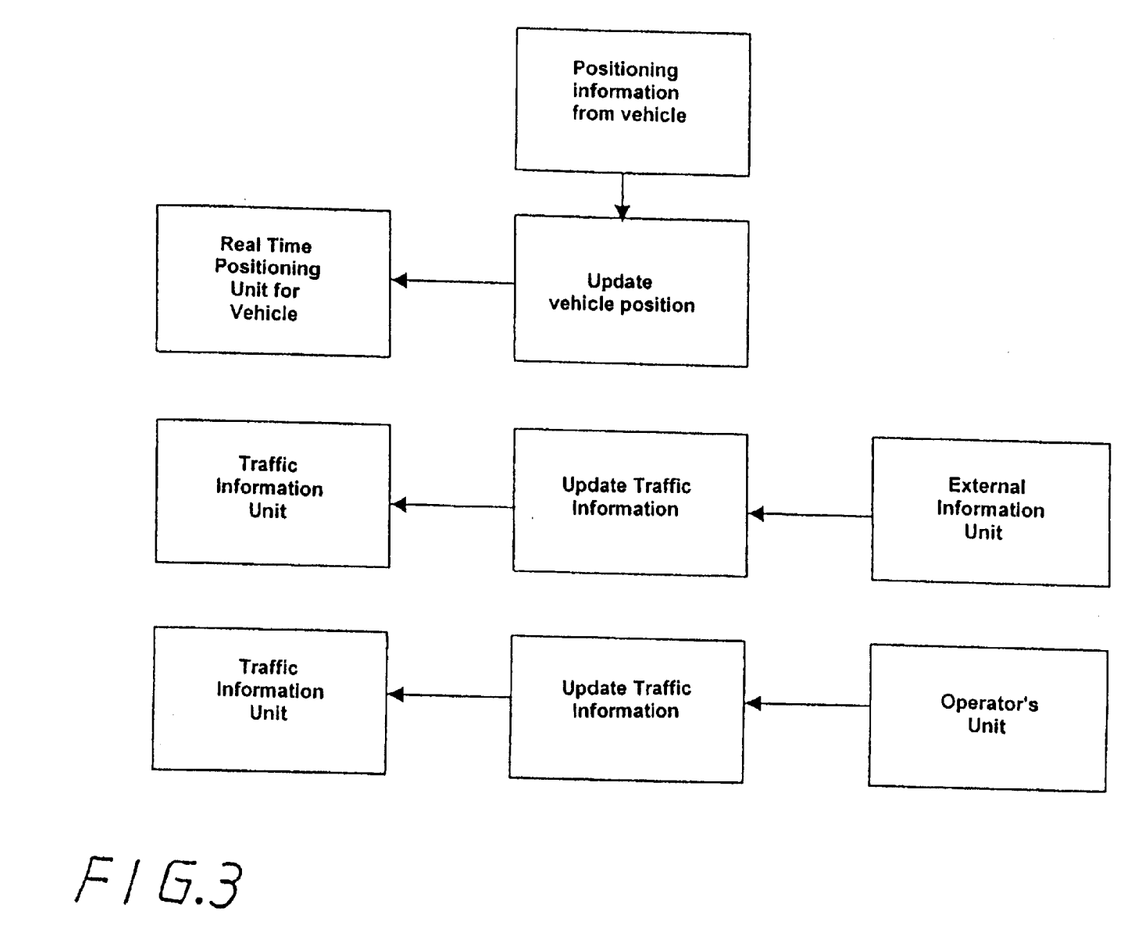
FIG. 3 shows dynamic traffic data.
Figure 4:
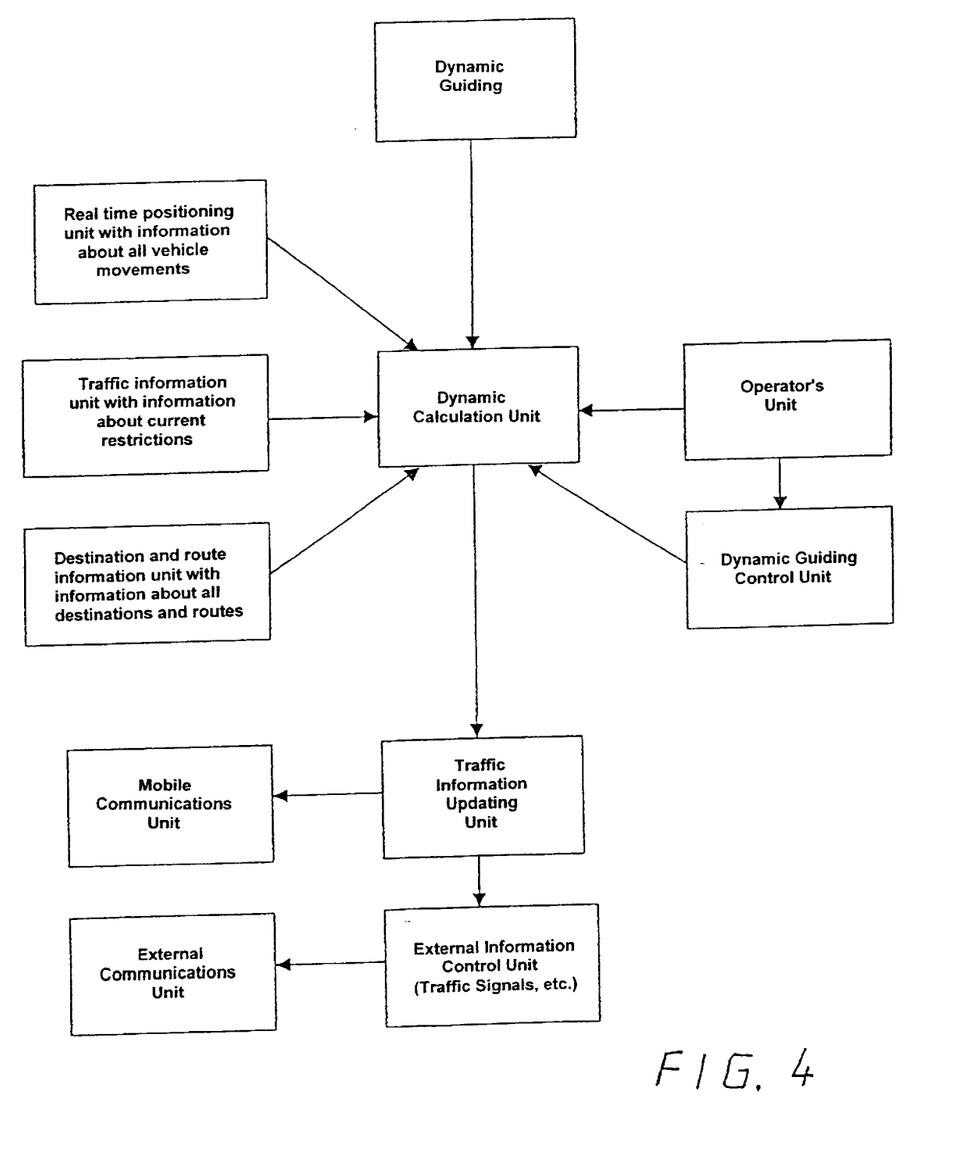
FIG. 4 shows dynamic control.
Figure 5:
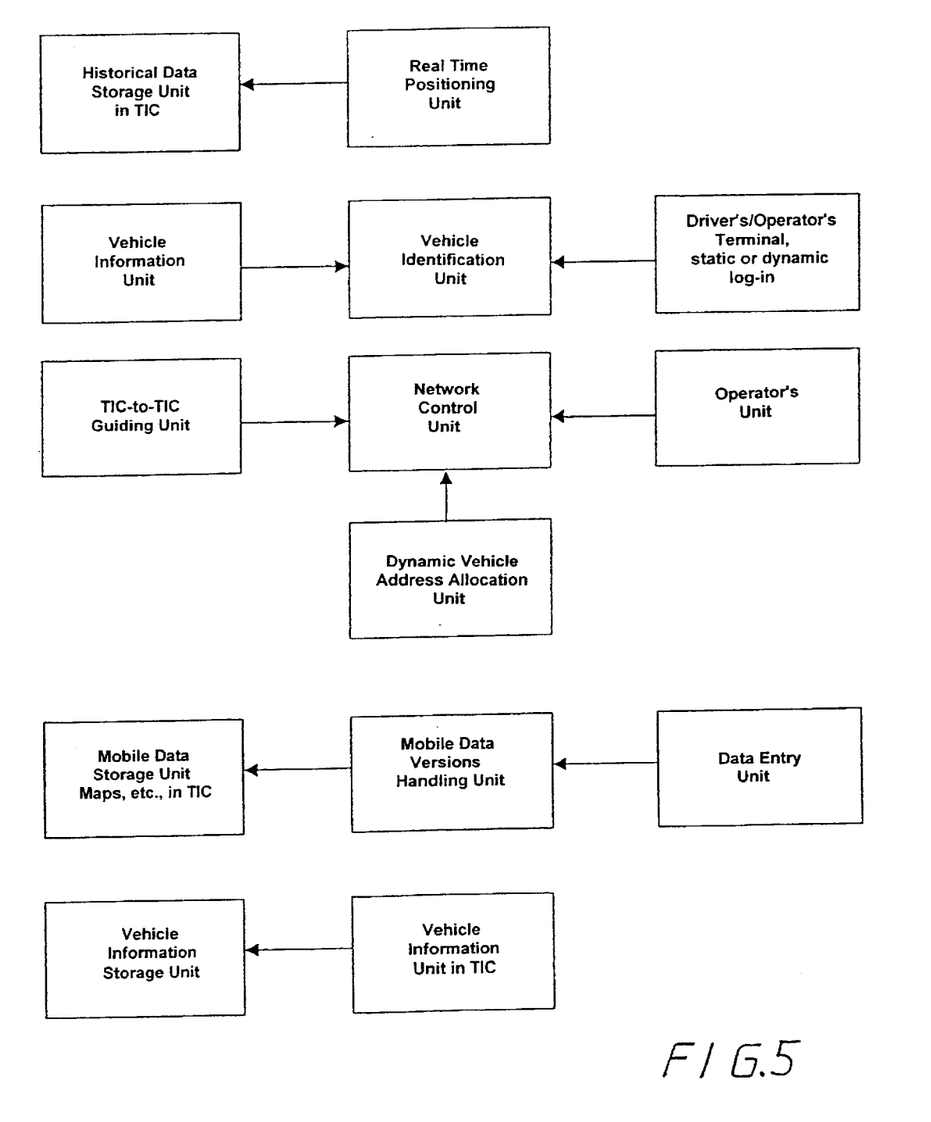
FIG. 5 shows data storage.
Figure 6:
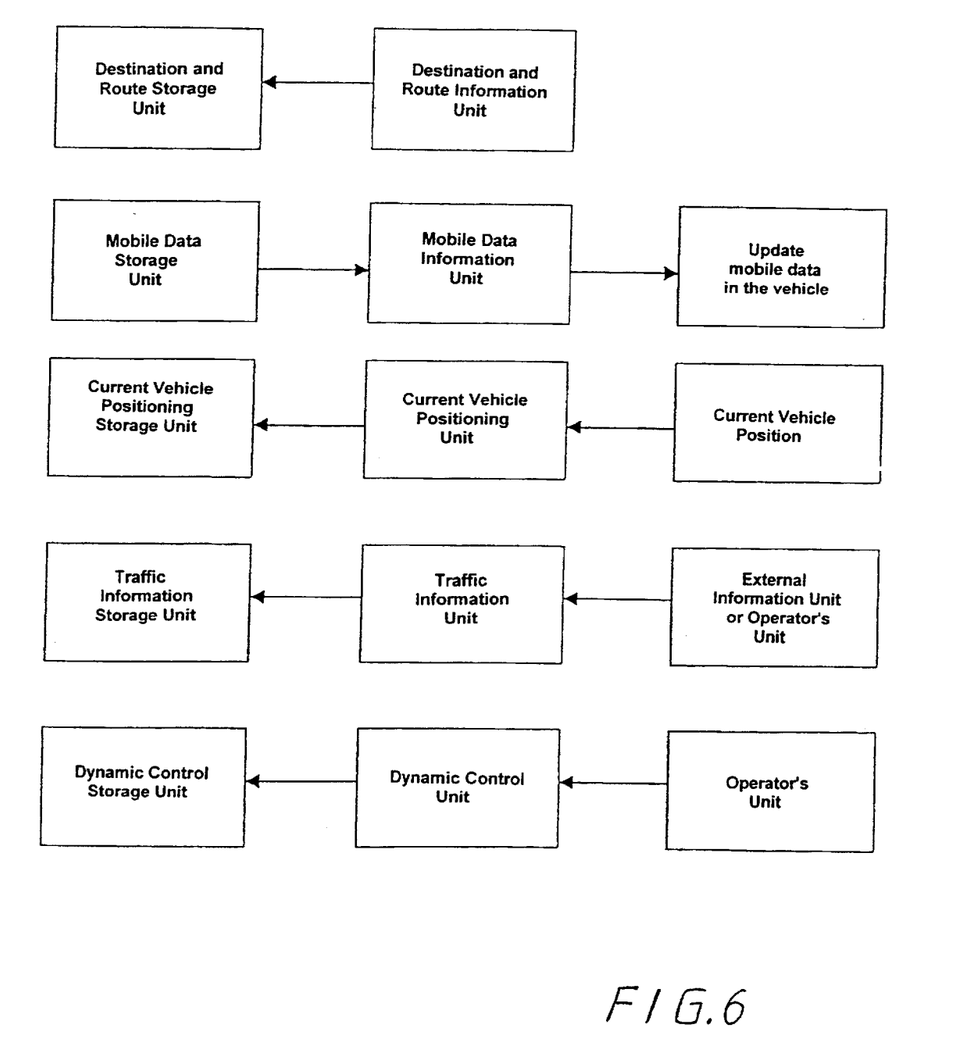
FIG. 6 shows more data storage.
Figure 7:
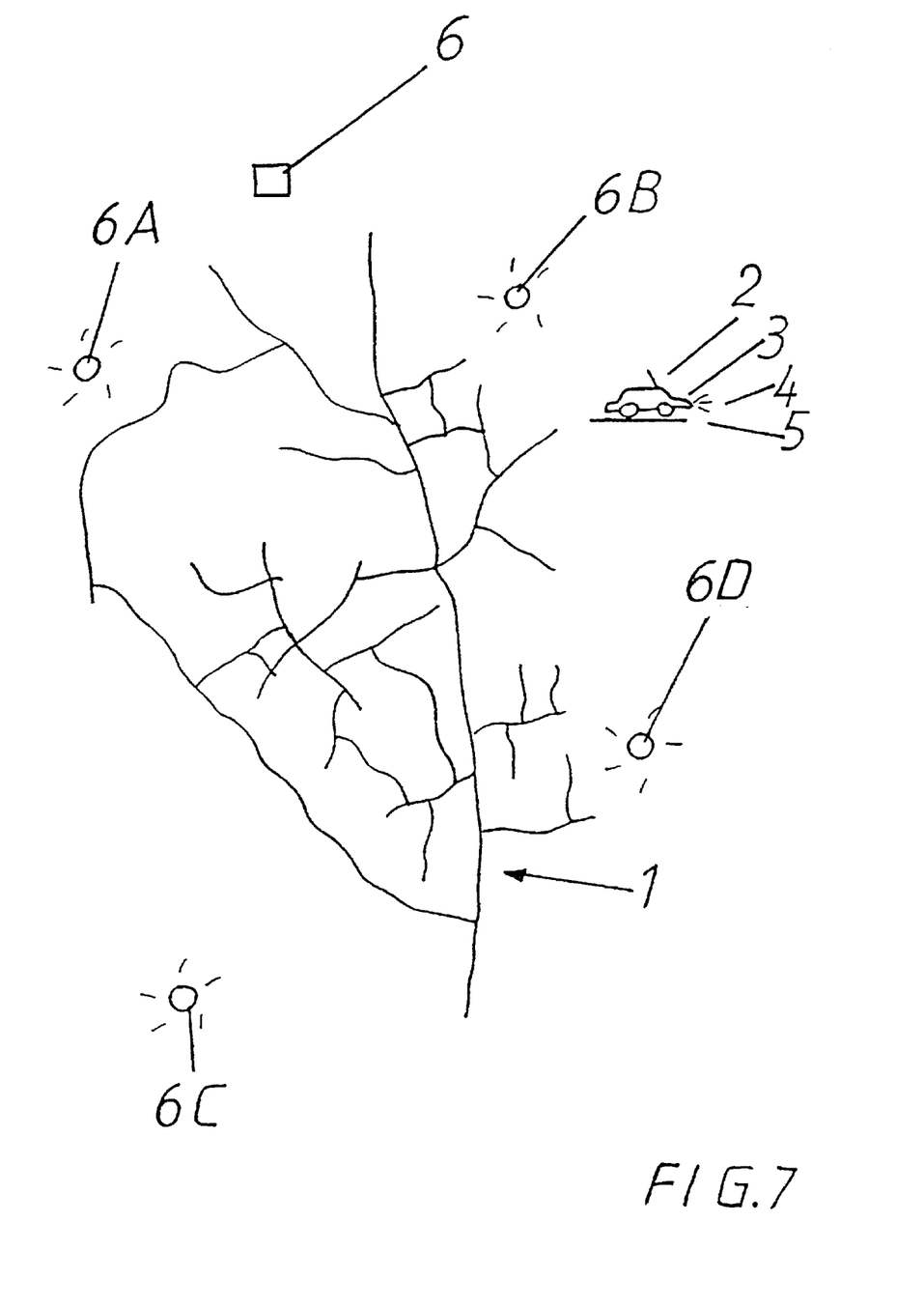
FIG. 7 shows the system with is constituent parts schematically.
Figure 8:
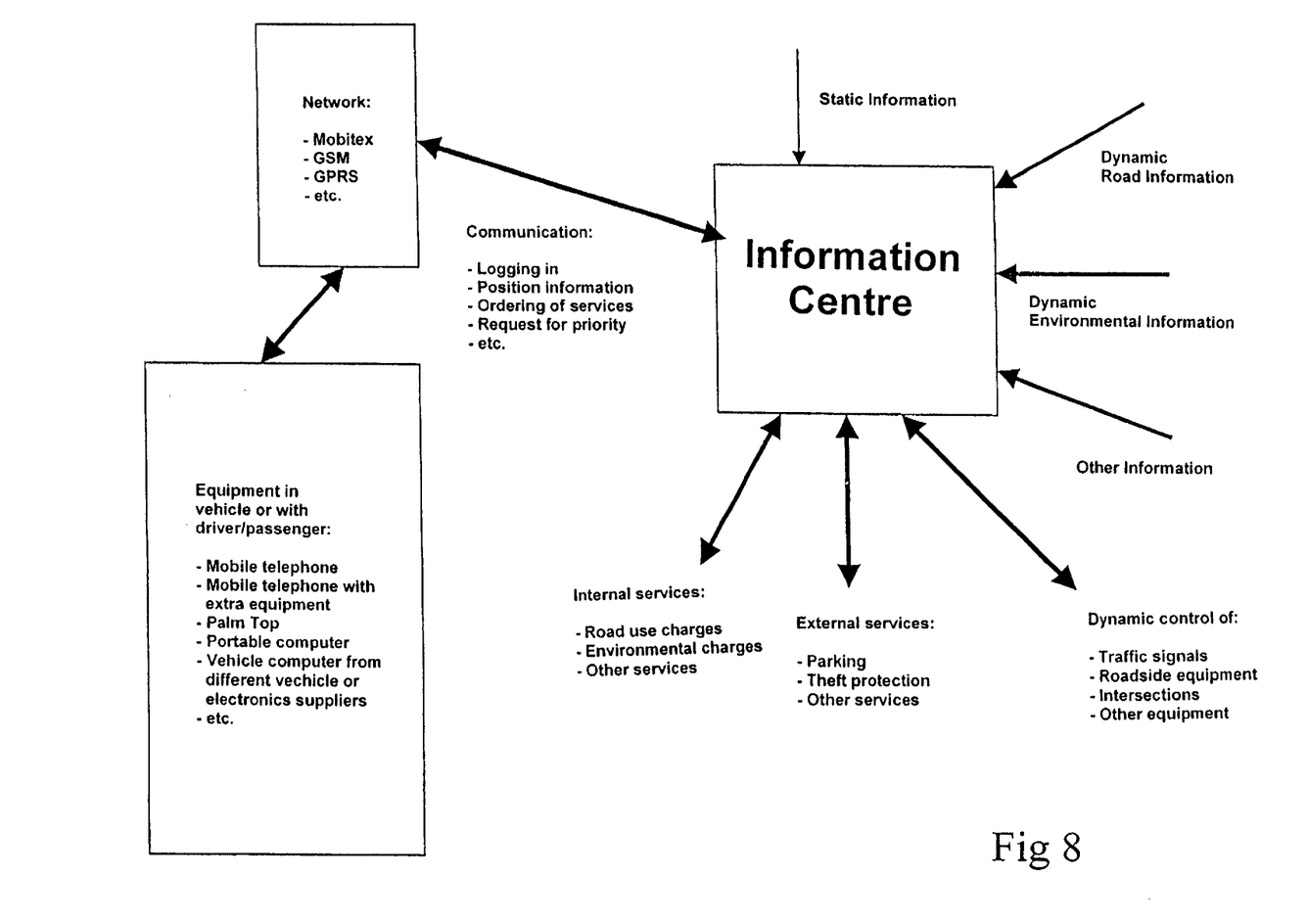
FIG. 8 shows different parts of the system indicated.

The present system is described briefly below in the form of tabulated data and the function of the system.

| Guiding ID | Notes |
|---|---|
| Communications ID | IP address or similar for the identification of an individual vehicle (according to what is already known). The system permits dynamic allocation of in IP address. |
| Customer ID with information about stored information must be used. | Customers who have requested a guiding ID to be stored in the control center are only able to send the dynamic parameters in this way. |
| Vehicle ID with information about: registration number, country code, vehicle type, engine, etc., environmental equipment, size (height, length, etc.). | Vehicle information. |
| Goods and passenger ID, number, type, function. | Number of passengers, type of goods (hazardous goods, etc.), public transport vehicles (in service, running empty, 10 minutes late). |
| Equipment ID, type, network, language, level versions, map handling function, version map handling, channel. | Vehicle's/driver's/passenger's communications equipment, type (mobile telephone/palmtop, in-car computer/Volvo, etc.) network for communication (GSM, etc.), language (in which language do I wish to receive the communication?), level (different levels of information, from detailed information to brief, summary messages), versions of software in the equipment to enable adaptation of functionality, map handling function indicates what level of map information can be received, channel describes whether information must be distributed, e.g. between mobile telephone and in-car equipment, and how this must take place. In this case, there are two items with an equipment ID. |
| Priority ID, type of priority. | The request for priority can be made by different vehicles in public transport, |

-continued

| Guiding ID | Notes |
| --- | --- |
|  | emergency vehicles and heavy goods vehicles or environmentally hazardous traffic. |
| Automatic, type, etc. | Information about automatic equipment, and of which kind, is available in the vehicle. This can apply to speed control, burglar alarm and alcohol lock, etc. |
| Other information. |  |
| External services: parking space, automatic road use charge. | Services intended primarily to reduce transport work. |
| Information: | Free text for information about external services. |

Loggin in

Loggin in its important in order to obtain a complete picture of what players are present in the system. This can also be effected prior to the start of the journey, for example via a mobile telephone, an ordinary telephone or various types of computer equipment. One or more destinations and a Guiding ID are entered in conjunction with logging in. The information center transmits information about the proposed route and any other information that may be of interest.

Logging in can also acuate peripheral systems to prepare for various activities.

| Logging in message | |
| --- | --- |
| Information | Notes |
| Guiding ID | |
| Destination 1 | |
| Activity | |
| Destination 2 | |
| Activity | |
| Destination 3 | |
| Parking required | |
| Alarm required when parked | |
| Priority | Only for selected groups, e.g. in commercial traffic. |
| Other | |

Logging in also proposes to provide information about the position and status at regular intervals to enable the information center to monitor the flow. The vehicles must also be able to leave "floating-car-data". The center replies to logging in with information in respect of how often the vehicle must inform the center of its position, etc.; this is the so-called "updating frequency".

| Status message | |
| --- | --- |
| Information | Notes |
| Guiding ID | |
| Position | |
| Destination 1 | Changed, if required |
| Etc. | |

Data network The method of regarding the road network as a data network brings with it a number of new benefits which significantly increase the flow in the system.

| Link information also includes the following, in addition to the traditional traffic information: | |
| --- | --- |
| Information | Notes |
| Traffic information | Related to speed restriction, historical normal flow and number of lanes, etc. |
| Vehicle types | Types of vehicle permitted on this link. |
| Environmental data | Environmental classification required by the vehicle to drive on the link. |
| Control | Parameters for controlling traffic signals, etc., to increase the flow in the data network. |
| Dynamic information | "One lane is closed between 1 and 9 September due to refurbishment of a building", "Direction of travel changed on one lane during the period . . . due to road works", etc. |
| Dynamic environmental data | Inversion or similar, and time period. |
| Road use charge | Fixed charge, or variable charge by type of vehicle, by environmental classification, dynamic environmental data, number of passengers, public transport vehicles and requested priority, etc. |
| Other | |

Functions

We can change the traffic flow via signal control

We can change the flow on the link via dynamic road data (road works, etc.)

We can change the control criteria via environmental data (inversion)

The types of vehicles permitted to drive on the links (no buses, etc.) affect the guiding Environmental classification on the links affects guiding and road use/environmental charges Dynamic environmental information (inversion—no diesel vehicles in the town) affects the guiding, etc.

The invention is to make optimum/maximum use of the network. A good picture of all vehicle movements is obtained via "floating-car-data". Dynamic road information and environmental data, etc., together with traffic data, provide the basis for controlling signals and requesting parking spaces, etc. Each vehicle is then guided on the basis. Charges:

The collection of charges (road use charge, environmental charge, etc.) is linked to the ID, logging in and the road network. It is possible in this way to create a highly flexible charging structure and for payment to be effected via a cash card in the car or via processing at the information center. Heavy goods vehicles pay one price, and passenger cars powered by hydrogen gas pay a different price. Payment of external services, such as parking, etc., can also be linked to this.

A system for achieving the effective control of vehicle movements in densely populated areas and at other locations where there is heavy traffic, which comprises a road network 1 in which the each vehicle 2 exhibits means 3 for identification and means 4 for road information and means 5 for the transmission of information between the vehicle 2 in question and a traffic information center 6, is of a nature in accordance with the present invention such that the road network 1 is so arranged as to be entered into the system so that it is regarded as a data network. Every vehicle 2 that proposes to use the road network is logged in for its journey on the road network 1. In accordance with the invention, each vehicle 2 identifies itself at the time of loggin in, in conjunction with which the aforementioned identity is either dynamic of static, i.e. like the IP address of a computer in data network. The dynamic identity, which is a faked ID, is used in those cases in which the invention is used for applications which do not require unique identification. Information about the desired destination is sent from each vehicle 2 principally to the nearest traffic information center 6, either in conjunction with logging in or later in the course of the journey if a new destination is desired, information about the position and speed of the vehicle is also reported at regular intervals to the aforementioned traffic information center. On the basis of the information reported to the traffic information center 6, overall control of the traffic is provided, and information about the resulting recommendation for the selected best route for each vehicle is transmitted from the traffic information center 6 concerned to the vehicle 2 in question, and dynamic guiding of the traffic is obtained in this way. Each vehicle 2 can obtain a new recommended route as the journey proceeds, if the traffic situation has changed. Thanks to the fact that the movements of all vehicles are known, an overall traffic system is obtained which displays an exact picture of the current traffic situation, as a result of which its control is possible from a central location. The driver of a vehicle 2 indicates his desired destination, and on the basis of this and by drawing on knowledge of other factors affecting the traffic and the road situation, the traffic information center 6 produces a recommended route. The driver can still elect to drive by a different route. If an incident occurs which affects the traffic conditions or the road conditions, and which means that the route already proposed is no longer as good, the traffic information center 6 produces a new recommendation as the journey proceeds.

A number of traffic information centers 6, 6A, 6B, 15 6C, 6D . . . is thus arranged at a mutual distance from one another, and from this network unique addressing is arranged to take place to these centers in order to permit roaming between the centers 6, 6A, 6B, 6C, 6D . . .

Information about the present position of the vehicle and about the speed of the vehicle is arranged to be sent at regular intervals from the respective vehicle 2 to the aforementioned traffic information center 6.

Dynamic updating of semi-stationary data, such as map and address information, etc.," is so arranged as to be achieved by means of an updating protocol.

Information relating to the respective vehicle, such as its type, model year, presence of a catalyser, and details of environmentally friendly fuel, etc., is also so arranged as to be transmitted to the traffic information center 6 in conjunction with logging in. Arrangements are made at the time of logging in either for an ID to be obtained, of a kind which is so arranged as to be used for guiding the vehicle 2 during its journey for applications which do not require unique identification of the vehicle 2 during its journey, or a static ID, of a kind which is so arranged as to be used for services in conjunction with the journey and/or at its end and/or during stops which call for unique identification. Moreover, updating of the position of the vehicle to the central traffic information center 6 for the system can be arranged to take place via a separate system, which is arranged in the vehicle 2 and which contains the aforementioned ID of the vehicle 2 and other information for the system.

Dynamic upgrading of the route is also arranged so that it can be achieved, for example in the event of a changed traffic situation or traffic accidents, or where there is a wish to reduce the traffic temporarily or in certain areas, such as near schools. The system is also suitable for use in conjunction with payment, for example for using a certain road, etc., which is so arranged as to be recorded and invoiced from the aforementioned traffic information center, thanks to the identity ID of each vehicle.

The invention is described below in greater detail and more comprehensively.

The Invention

The invention is characterized by the idea that:

The road network is regarded as a data network, into which you "log in" when you drive out on the road.

Each vehicle identifies itself in conjunction with logging in. The identity is international and contains information about the vehicle (type, model year, catalyser and environmental fuel, etc.). It is important to point out that the identification can be dynamic (at the time of loggin in, an ID is obtained which is used primarily to guide the vehicle during the journey) or static (a unique ID, which, in addition to guiding, can also be used for other services).

Each driver must enter his desired destination, at least in conjunction with logging in, but also later if the destination changes during the journey.

The vehicle provides information at regular intervals about its current position together with information about its speed, etc.

And in addition by the following:

The network is international with unique addressing to all monitoring stations. Traffic information center (TICs), which permit roaming (the vehicle can obtain guidance from a center and, when it enters the area of another center, the latter takes over). All vehicles have access to these codes, which means that guiding can take place for international transports.

Dynamic updating of semi-stationary data such as maps and addressing information, etc., is handled via an updating protocol. A major problem associated with guiding is the particular problem of keeping a map updated. The vehicle describes the revision of geographical data and other relevant guiding information that the vehicle has stored—locally. This is to ensure that updating can take place "on-line".

Primary Function

The invention makes it possible:

To undertake dynamic guiding. Dynamic guiding of vehicles is something for the solution of which the EU's research program has invested masses of resources. The basic problem is that the point of departure is a static traffic model which is based on historical information. An attempt is made to add to this dynamic information that has been gathered from various points of measurement. Reliable traffic measurement equipment is expensive, and this is the reason why few measurement points have been used. This further reduces the accuracy of the calculated information. This invention draws on the fact that information about the movement of vehicles in traffic systems is available and performs the calculations required in order to optimize the flow deriving therefrom. No investments in a fixed infrastructure are required.

Via dynamic guiding, use can be made of additional parameters in conjunction with the choice of route. This can involve the following benefits for society: Environmental guiding—where certain vehicles are not permitted to drive on certain sections of road. Hazardous goods—creating safe corridors. Emergency rescue—creating emergency rescue routes, etc. For the motorist, this can involve: the quickest route—the quickest route is chosen without regard for the cost. The cheapest route—in which account is taken of the cost of fuel and road use and environmental charges, etc. The most environmentally friendly—prioritize the environmental aspects. No queues—I do not want to sit in traffic jams, etc.

Dynamic control of traffic signals, public transport and other systems that influence the traffic flow.

Guiding need not take place in areas where the traffic problems are limited. Here it may be used only in conjunction with accidents.

Guiding can take place in conjunction with accidents, etc., where each vehicle can obtain special guiding when the destination of the journey is known. Information can already be provided in conjunction with "logging in" in the case of road works and planned restrictions or changes in the traffic.

Selective traffic information can be distributed when the vehicle's route is known.

There are also other additional features:

Permanent equipment in the road network identifies itself in those cases in which it is able to communicate with the vehicle and/or the TIC 6. This can apply to equipment which identifies the presence of, for example, pedestrians or signal control systems.

Functions for vehicle-to-vehicle communication are available, which offer the possibility of introducing various forms of warning system.

Speed monitoring can take place via the TIC 6. Equipment in the car will be capable in the future of lowering the speed automatically via information which is contained in the vehicle's computer and is updated dynamically via the TIC 6 or permanent equipment, such as from traffic lights at intersections.

It is possible to introduce virtual humps. This is a reduction in speed of fairly short duration, for example at an intersection. The dynamics of the method permit the introduction of dynamic humps, for example during school hours or in conjunction with road works.

Traffic planning is able to obtain information about exact flows in the traffic system for use in its planning. One of the places in which this taking place today is Gothenburg, via a numerical census conducted every four years due to the cost.

The ability to "play back" sequences in accidents, incidents and traffic jams, etc., in order to find out about the sequence of events associated with sudden changes in the traffic flow.

The debiting of road use charges, etc., can take place without unique identification if the equipment in the vehicle is supplemented with a unit for reading cash cards or similar equipment where the driver has affected payment in advance, and if the system comprises means which offer the possibility of debiting the cash card or similar equipment.

Functions Which Require a Unique Identification

The requirement to identify oneself uniquely is not a popular idea. There will be genuine resistance to systems which call for this. It is important, therefore, that the invention should point clearly to the fact that this is only required for a limited number of functions, which are reported below.

The system also has functions for the following:

For example, road use charges can be registered against the identity of a specific vehicle. The charge can be registered in relation to a particular road link and/or a unit of time.

It is possible to introduce environmental charges in the same way as road use charges. This can take place in limited area and at specific times. Changes can be introduced very rapidly with the help of this dynamic information.

E-mail, or other information can be sent to a unique vehicle, since it possesses an identity of its own in the network.

It is possible to request services via the TIC, such as a parking, etc.

Theft prevention can be implemented via the TIC. You switch on your unique identity when you park.

A large number of advantages are achieved in this way with the present invention, and the question of the vehicle and/or the information location requesting a route without these in return notifying their destination does not arise.

No extra equipment is required in the vehicle in order to monitor and invoice road use charges, for example, to the road users if static addressing is used, and verification of whether payment has been effected from a previously invoiced journey is performed in conjunction with logging in. Zoning now takes place with the help of software and requires no change to the program in the vehicle 2 or investments in the infrastructure, and this subdivision can take place all the way down to individual road segments.

The choice of route for each driver now arrives in accordance with the invention from the central traffic information center 6 of the system, whereas updating of the current position of the vehicle is sent to the aforementioned central traffic information center 6 as described above.

Means for solving the above-mentioned technical transmissions can be implemented with previously disclosed solutions for that purpose. The novel and unique features of the invention are its construction, function and interaction. The invention is not restricted to the solutions described above and illustrated in the drawings, but may be is varied within the scope of the Patent Claims without departing from the idea of invention.

What is claimed is:

1. System for controlling vehicle movements, in areas containing a road network, and a plurality of vehicles that exhibit means for identification, means for road information and means for transmission of information between the vehicle and a traffic information center, characterized in that the road network is so arranged as to be entered into the system as a data network, each vehicle that is intended to make use of the road network is logged in for travelling on the road network, the each vehicle is identified with an identity at the time of logging in, in conjunction with which the identity is either dynamic or static, information relating to the intended destination is sent in from each vehicle to the traffic information center in conjunction with logging in or later in the course of a journey when there is a new desired destination, information about position and speed of the each vehicle is reported at regular intervals to the aforementioned traffic information center, whereby overall control of the traffic is achieved on the basis of the information reported to the traffic information center, information about a proposed route for each vehicle is transmitted from the traffic information center to the each vehicle and the system exhibits an exact image of the actual traffic situation and guides the traffic dynamically, for control of the traffic situation centrally.

2. System in accordance with claim 1, characterized in that a number of traffic information centers are arranged at a mutual distance from one another, and that unique addressing is so arranged as to take place from this network to these centers in order to permit roaming between the centers.

3. System in accordance with claim 1, characterized in that information about the present position and information about the present speed of the each vehicle is arranged to be sent at regular intervals from the each vehicle to the traffic information center.

4. System in accordance with claim 1, further characterized in that dynamic updating of semi-stationary data, is achieved by means of an updating protocol.

5. System in accordance with claim 4 wherein semi-stationary data includes map and address information.

6. System in accordance with claim 1, characterized in that vehicle information relating to the each vehicle, transmitted in conjunction with the each vehicle logging in.

7. System in accordance with claim 6, characterized in that the identity for the each vehicle is so arranged as to be used for guiding the each vehicle during the each vehicle's journey.

8. System in accordance with claim 7, characterized in that updating of the position of the each vehicle to the central traffic information center takes place via a separate system in the each vehicle, said separate system contains the identification data of the each vehicle and other information for the system.

9. System in accordance with claim 6, characterized in that the identity for the each vehicle is indicated in conjunction with logging in, and the identity can be used for services in conjunction with the journey and/or at the end of the journey and/or during stops.

10. System in accordance with claim 6, wherein vehicle information comprises type, model year, presence of a catalyser, details of environmentally friendly fuel and combinations thereof.

11. System in accordance with claim 1, characterized in that dynamic updating of the route can be obtained from the traffic information center, which will give a new suggestion for a route, in the event of one of a changed traffic situation, a traffic accident and a wish for a reduced volume of traffic.

12. System in accordance with claim 1, characterized in that payment for using a certain road is so arranged as to be recorded and invoiced from the traffic information center.

13. System in accordance with claim 1, characterized in that the equipment in the vehicle includes a unit for reading cash cards, or equipment where payment has been effected in advance.

* * * * *